United States Patent
Ott et al.

(10) Patent No.: US 6,915,201 B1
(45) Date of Patent: Jul. 5, 2005

(54) METHOD AND DEVICE FOR CONTROLLING VEHICLE SPEED DURING DESCENT

(75) Inventors: Thorsten Ott, Hemmingen (DE); Christian Goldbach, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 655 days.

(21) Appl. No.: 09/586,214

(22) Filed: Jun. 2, 2000

(30) Foreign Application Priority Data

Jun. 2, 1999 (DE) .......................... 199 25 368

(51) Int. Cl.⁷ .......................... G06F 7/00; G06F 17/00
(52) U.S. Cl. .......................... 701/93; 701/96; 701/1; 180/170
(58) Field of Search .......................... 701/93, 96, 91; 180/167; 188/170, 180; 303/199

(56) References Cited

U.S. PATENT DOCUMENTS

| | | | | |
|---|---|---|---|---|
| 4,169,437 A | * | 10/1979 | Fleischer | 123/102 |
| 4,495,836 A | * | 1/1985 | Cohen | 74/751 |
| 5,197,564 A | * | 3/1993 | Nishimura et al. | 180/179 |
| 5,685,801 A | * | 11/1997 | Benford et al. | 477/108 |
| 5,722,912 A | * | 3/1998 | Narita | 192/3.31 |
| 5,794,170 A | * | 8/1998 | Kuroda et al. | 701/93 |
| 5,794,735 A | * | 8/1998 | Sigl | 180/170 |
| 5,868,214 A | * | 2/1999 | Workman | 180/179 |
| 5,890,993 A | | 4/1999 | Horiguchi et al. | |
| 6,076,036 A | * | 6/2000 | Price et al. | 701/93 |
| 6,078,860 A | * | 6/2000 | Kerns | 701/93 |
| 6,202,780 B1 | * | 3/2001 | Tanaka et al. | 180/179 |
| 6,233,514 B1 | * | 5/2001 | Claussen et al. | 701/93 |
| 6,243,640 B1 | * | 6/2001 | Beever | 701/70 |

FOREIGN PATENT DOCUMENTS

| | | |
|---|---|---|
| DE | 3736807 | 5/1989 |
| EP | 0 336 913 | 10/1989 |
| GB | 2 022 737 | 12/1979 |
| GB | 2 325 716 | 12/1998 |
| JP | 06 135260 | 5/1994 |

* cited by examiner

*Primary Examiner*—William A. Cuchlinski, Jr.
*Assistant Examiner*—Olga Hernandez
(74) *Attorney, Agent, or Firm*—Kenyon & Kenyon

(57) ABSTRACT

A method and a device for controlling a vehicle in which the vehicle's speed is only regulated, i.e., limited, if descent is detected. Descent detection is carried out based on the vehicle's actual acceleration and a calculated model acceleration of the vehicle, descent being detected if the rate of change of the actual acceleration and the difference between the actual acceleration and model acceleration are positive.

7 Claims, 3 Drawing Sheets

METHOD AND DEVICE FOR CONTROLLING VEHICLE SPEED DURING DESCENT

FIELD OF THE INVENTION

The present invention relates to a method and a device for controlling a vehicle.

BACKGROUND INFORMATION

To control a vehicle, functions are used, among other things, which regulate, i.e., limit, its speed. These functions may be particularly significant during descent, as they keep the vehicle from exceeding a predefined speed. Particularly with off-road vehicles, during descent it is desirable to regulate, i.e., limit, the speed so that it remains very low. This in turn involves certain risks during normal operation, i.e., during ascent or horizontal travel, as the vehicle may brake suddenly in undesired situations if this controller, i.e., limiter, intervenes in an undesired manner. Heretofore, the method used to keep the controller, i.e., limiter, from intervening in an undesired manner is to limit the operating range to the first gear and/or reverse.

SUMMARY OF THE INVENTION

An object of the present invention is to provide measures so that undesirable situations of this kind can be avoided. Furthermore, the object of the present invention is to provide suitable measures for detecting when the vehicle is traveling downhill.

It is possible to considerably improve the ease of use and operating safety of speed controllers, i.e., speed limiters, for descent because undesirable situations can be avoided effectively, as the controller, i.e., limiter, is only activated if descent is detected; this means there is no need for further constraints on the operation of the controller, i.e., limiter, (e.g., on a speed range, on a certain transmission ratio, such as first gear and/or reverse). Altogether, the controller, i.e., limiter, can be used in a broader range of applications without jeopardizing the vehicle's operating safety.

It is especially advantageous that the driver can leave the controller, i.e., limiter, permanently switched on, because it is only activated in an operating situation for which it is intended, namely descent.

It is especially advantageous to use a tilt sensor that supplies a signal representing the tilt of the vehicle, thus allowing very reliable descent detection.

Furthermore, it is especially advantageous to determine descent based on the vehicle's self-acceleration, whereby it can be estimated in an straightforward and reliable manner whether or not the vehicle is traveling downhill.

It is particularly advantageous additionally to use the wheel brake pressure to improve descent detection.

Further advantages can be derived from the description of exemplary embodiments provided below and, respectively, from the dependent claims.

DETAILED DESCRIPTION

Figure 1:
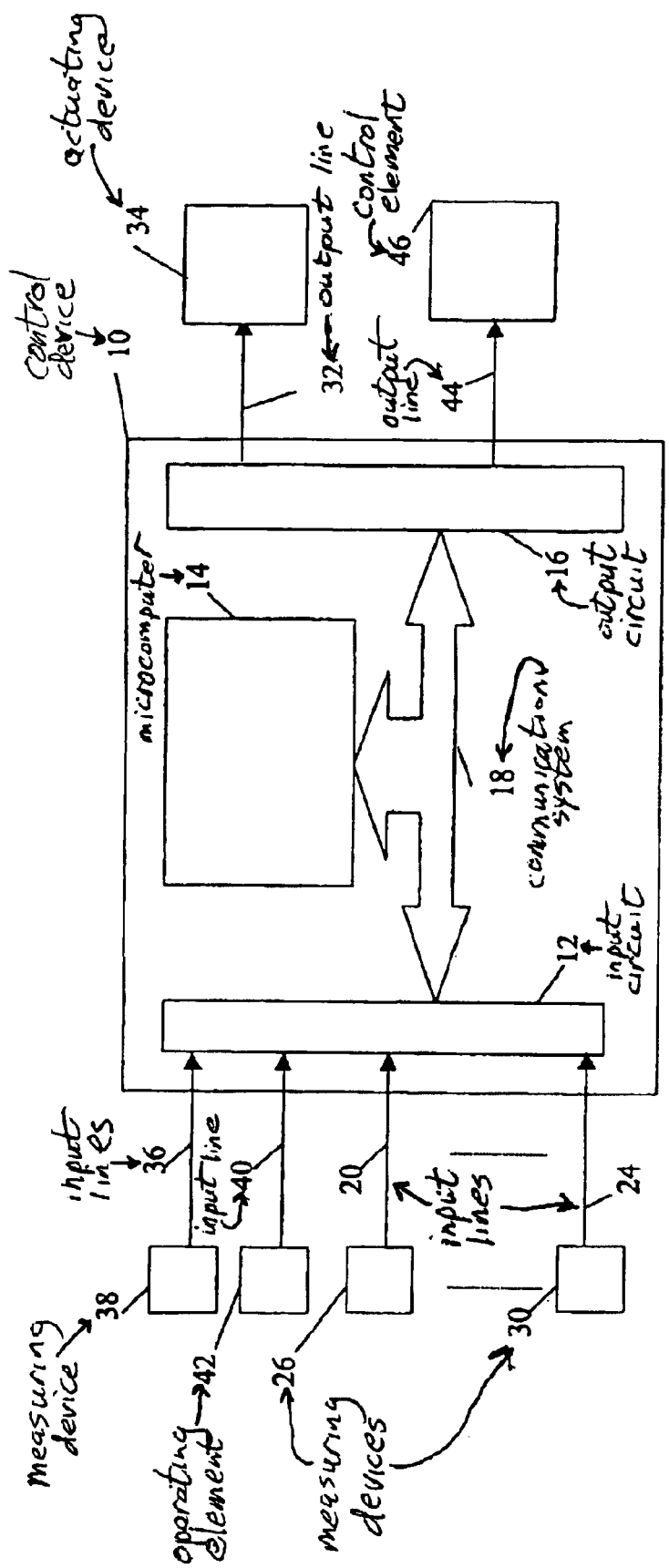
FIG. 1 shows an overview block diagram of a control device for controlling a vehicle, in particular in conjunction with a speed controller, i.e., speed limiter.

FIG. 1 shows an overview block diagram of a control device 10 for controlling a vehicle. In the preferred exemplary embodiment, this control device includes, among other things, a speed controller, i.e., speed limiter. Control device 10 has an input circuit 12, at least one microcomputer 14 and an output circuit 16. These elements are connected to one another via a communication system 18, which is used to exchange data. A measuring device 38 for measuring the vehicle speed is connected via input lines 36 to input circuit 12, to which an operating element 42, which can be operated by the driver and which is used to activate and if necessary predefine the setpoint values for the speed controller, i.e., speed limiter, is connected via an input line 40. Furthermore, measuring devices 26 to 30, which are used to measure further vehicle performance quantities that are evaluated within the scope of the functions of control device 10, are connected to input circuit 12 via further input lines 20 to 24. In the case of the preferred exemplary embodiment, these performance quantities are the wheel brake pressure, the engine torque, the gear ratios in the drive train, etc.

As part of the control, i.e., limitation, (simply referred to below as speed control system or speed controller), the at least one microcomputer 14 in control device 10 influences the braking force on the vehicle's wheel brakes via at least one output line 44 and at least one 10 control element 46 (e.g., in a brake system having anti-lock brake/anti-slip regulation elements). Furthermore, in an exemplary embodiment the power output of the vehicle's drive unit is influenced via the at least one output line 32 and at least one actuating device 34 (e.g., an electronic engine control device).

In the preferred exemplary embodiment, the speed controller located in control device 10 and implemented in microcomputer 14 is used exclusively to control, i.e., limit, the speed during descent, no further constraints on functioning being provided during descent. The controller may therefore be active in any gear. However, in higher gears measures are taken to keep the engine from stalling (e.g., so that the RPM level does not fall below a specified threshold). A setpoint speed is predefined for the speed controller, this speed being low (e.g., 10 km/h) in the case of the preferred exemplary embodiment; the vehicle's speed is determined, for example by evaluating wheel speed signals or by evaluating a vehicle speed sensor and, based on the difference between the setpoint speed and the actual speed, the wheel brakes are actuated so that the actual speed is kept at, i.e., limited to, the predefined setpoint speed. Furthermore, in the case of the preferred exemplary embodiment, the vehicle's drive unit is influenced so that the vehicle's actual speed is increased to the setpoint speed if the vehicle is traveling too slowly and the brakes have been released.

In order to activate the speed controller, a switch which can be operated by the driver and which puts the speed controller into the 'standby' state is provided. In addition, a descent detection system is provided for the purpose of activating the speed controller, provided the switch element has been turned on in advance, if the vehicle is actually traveling downhill. There are two methods for detecting descent, depending on the exemplary embodiment. According to the first method, a vehicle tilt sensor is used, it's a signal unambiguously indicating the position of the vehicle. If the sensor signal that represents the vehicle's tilt exceeds a predefined threshold value indicating descent for the vehicle's current direction of travel (which can be determined from the transmission gear that has been engaged (reverse or forward) or from the suitable logic operations of sensor signals), the speed controller is activated, provided the switch element, which is designed as a switch or button depending on the exemplary embodiment, has been turned on. If the tilt sensor signal is less than this threshold value and/or the vehicle's direction of travel changes after the speed controller has been activated, the speed controller is deactivated and the brakes are released.

If no tilt sensor is provided, descent is determined from the vehicle's acceleration signals. To accomplish this, the rate of change of acceleration, the offset acceleration, which is caused by, among other things, the change in vehicle position, and, if necessary, the wheel brake pressure are analyzed.

With the help of the vehicle's momentum balance, the peripheral force for each wheel FiRAD is calculated from the following quantities: engine torque MMOT, drive train gear ratio Ü, wheel brake pressure PiRAD, wheel radius RiRAD and constants fi, which represent the proportion of total Cardan torque applied to a given wheel and brake coefficient Ci of the wheel brake in question.

$$FiRAD = (fi*MMOT*Ü - PiRAD*Ci)/RiRAD$$

The vehicle's model acceleration axmodell is determined by adding together all four wheel peripheral forces and dividing by the mass of the vehicle, which is predefined, measured or estimated, the force due to wind resistance also being taken into account. To determine vehicle speed VFZ, offset acceleration axoffset is calculated and used to correct model acceleration axmodell and to obtain actual acceleration ax (ax=axmodell+axoffset). During descent, the offset value is positive; during ascent it is negative. This is because the vehicle's actual acceleration is greater than the acceleration calculated from the model, due to the drive force associated with the incline when traveling downhill.

If the rate of change of acceleration is positive without the accelerator having been depressed, this also indicates descent. Thus if the rate of change of acceleration is positive and the offset value is positive without the accelerator having been depressed, the system concludes that the vehicle is traveling downhill. All other signal combinations indicate that the vehicle is traveling uphill or horizontally.

To sum up, the signal combinations are evaluated as follows:

|  | axoffset > 0 | axoffset <= 0 |
| --- | --- | --- |
| dax/dt > 0 | descent | ascent/horizontal travel |
| dax/dt <= 0 | ascent/horizontal travel | ascent/horizontal travel |

If descent is detected, the controller is activated; if ascent or horizontal travel is detected, the speed controller is deactivated so as to prevent any undesired braking. Herein, the deactivation method varies according to the embodiment, (e.g., the manipulated variable is not calculated, the manipulated variable is not output even though it has been calculated, etc.), and as a result the manipulated variable of the controller is no longer calculated or at least no longer has an effect.

To increase the safety of descent detection, the wheel brake pressure is taken into account. If pressure has been applied once by the speed controller, this is an indication that the vehicle is traveling downhill and that the speed controller is active. If, during descent, signal combinations occur that erroneously indicate that the vehicle is traveling uphill or horizontally, the wheel brake pressure is taken into account, which prevents the control system from being deactivated in an undesirable manner. Similarly, if descent has been detected and the speed controller is active, descent continues to be detected even if a signal combination is supplied that does not indicate a descent. Once wheel brake pressure is no longer being applied, if a signal combination indicating an ascent or horizontal travel is still present the controller is deactivated.

Programs of microcomputer 14 constitute a preferred embodiment of the methods described above. Examples of programs of this kind are described with reference to the flow charts shown in FIGS. 2 and 3.

Figure 2:
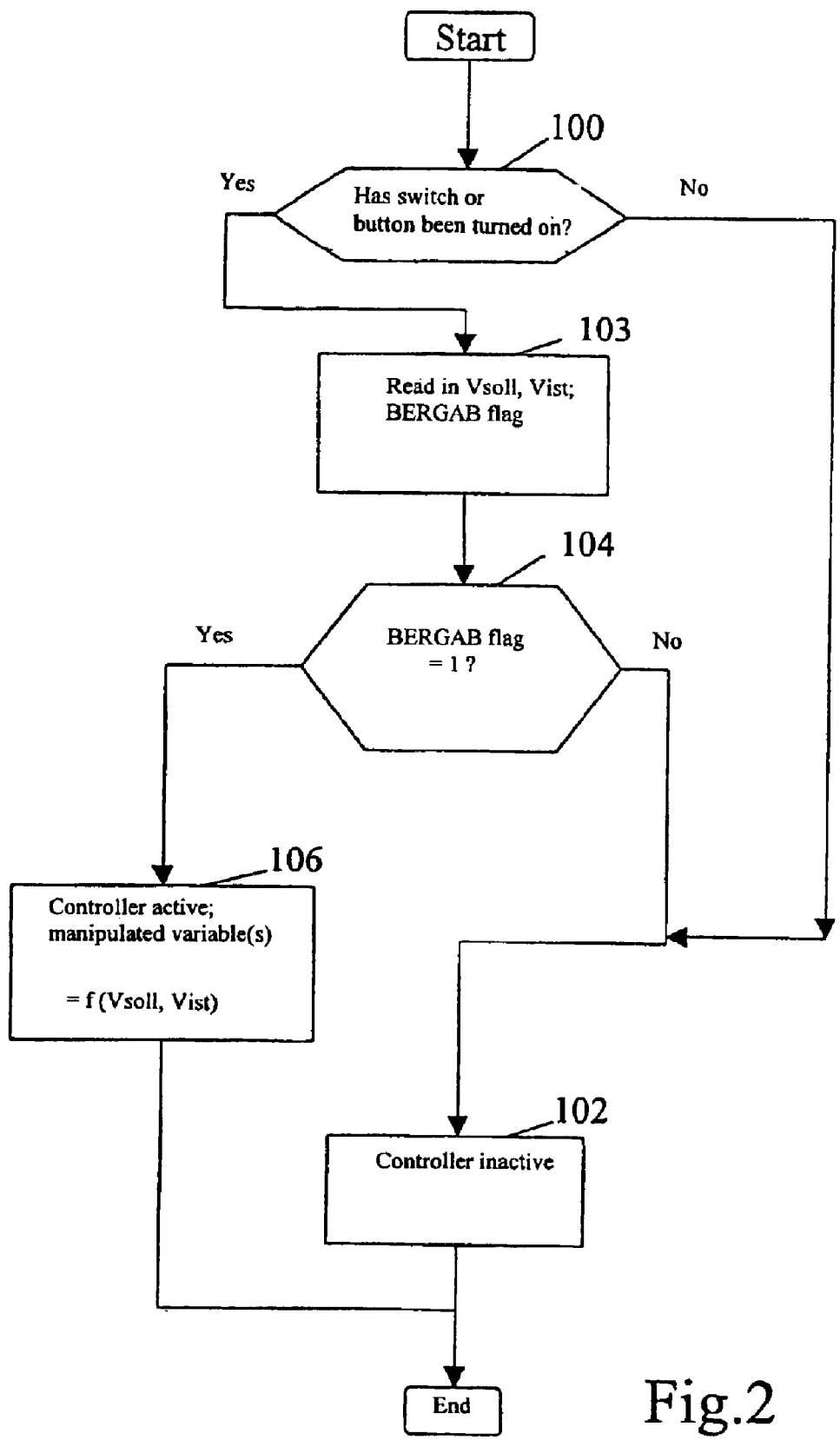
FIG. 2 is a flow diagram showing a preferred exemplary embodiment of a controller, i.e., limiter, designed for descent.
Figure 3:
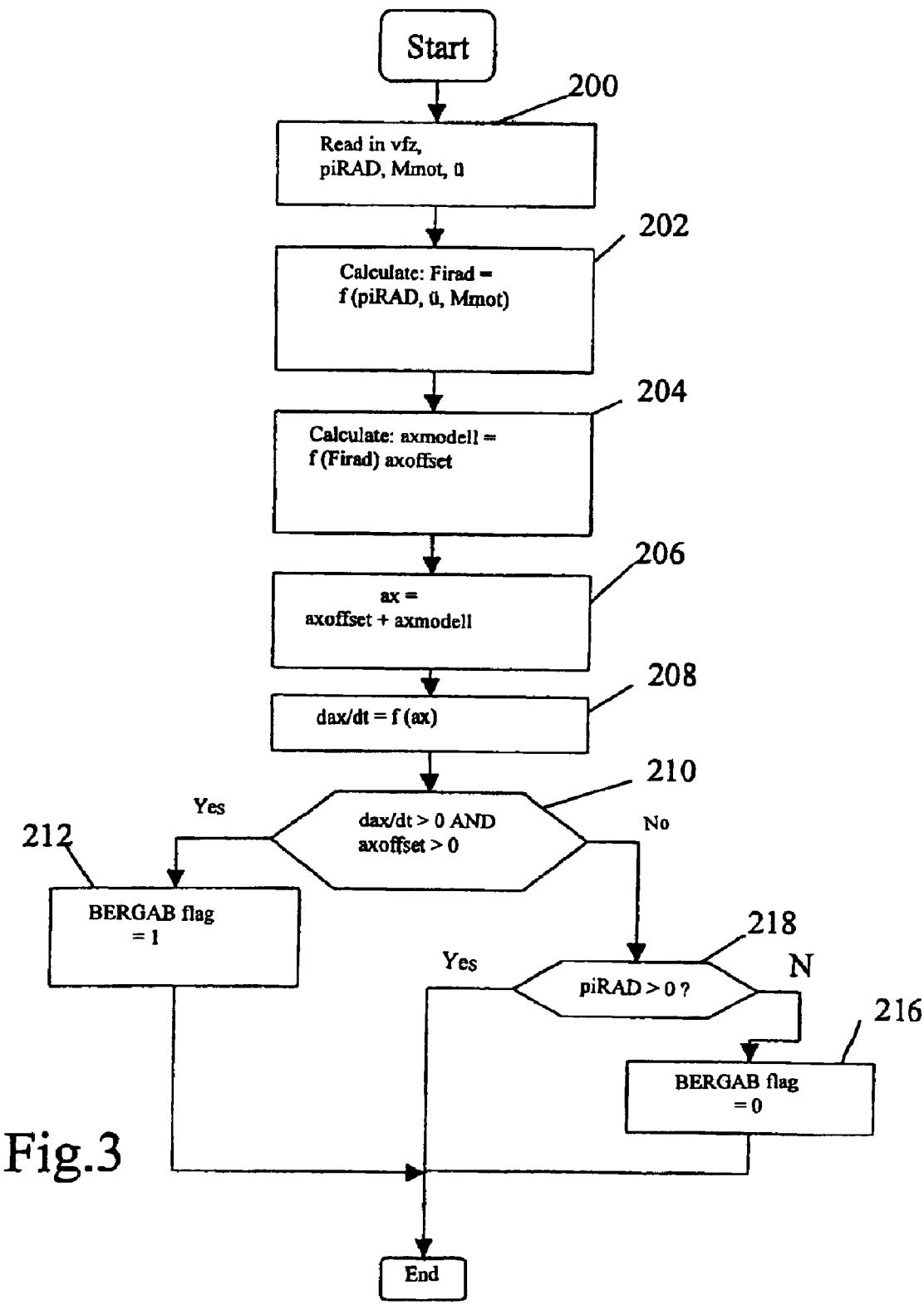
FIG. 3 is a flow diagram showing a preferred exemplary embodiment for detecting a vehicle traveling downhill.

The flow chart shown in FIG. 2 represents a program which is run in order to carry out speed regulation at predefined time intervals. In first step 100, a check is performed to determine whether the switch or button that activates the speed controller has been turned on. If not, regulation is not carried out (step 102) and the program is ended.

If switch 100 has been turned on, predefined setpoint speed VSOLL, measured or calculated actual speed VIST and flag BERGAB indicating descent are read in step 103. An example of a method for determining this flag is described below, with reference to the flow chart shown in FIG. 3. A further method for determining this flag results from evaluating the signal from a tilt sensor, the flag being set if vehicle tilt in the direction of travel in excess of a specific threshold value can be derived from the tilt sensor signal. After step 103, in step 104 a check is performed to determine whether flag BERGAB has been set. If not, the speed controller is inactive per step 102; if the flag has been set, the controller is activated per step 106, and the manipulated variable(s) are specified according to a predefined control strategy based on the setpoint speed and actual speed, so that the actual speed approaches the setpoint speed. After that, the program is ended and run again at the next specified point in time.

In an exemplary embodiment, deactivation of the controller varies according to whether the switch or button has not been turned on again or the flag has not been set. In the former case, the controller is switched off completely; in the latter case, it is active but does not have any effect ('standby' state).

In the preferred exemplary embodiment, descent is determined on the basis of the calculation of the vehicle's momentum balance. This is described below with reference to the flow chart shown in FIG. 3, this program also being run at predefined points in time. After the program component starts, in step 200 the performance quantities required to run the program below—vehicle speed VIST, wheel brake pressure PiRAD, drive torque MMOT and gear ratio Ü between the engine, the gears and the differential—are read in. Herein, the drive torque is supplied by the drive control unit; the wheel brake pressure values are either measured at each wheel brake, or, for example, are estimated based on the control signals from the brake pressure control valve. Correspondingly, the vehicle speed is measured or calculated based on selected wheel speed signals. Next, in step 202, the peripheral force of each wheel FiRAD is calculated based on wheel brake pressure PiRAD, gear ratio Ü and drive torque MMOT using, for example, the aforementioned equations. Next, in step 204, model acceleration axmodell is determined based on the peripheral forces of each wheel, the vehicle mass and offset acceleration axoff being taken into account. Next, in step 206, actual acceleration ax is determined by adding together offset acceleration axoffset and model acceleration axmodell. Next, in step 208, the time rate of change of the acceleration dax/dt is determined, for example via differentiation, based on actual acceleration ax. Next, in query step 210, a check is performed to determine whether the rate of change of acceleration is positive without the accelerator having been correspondingly depressed and whether the offset value is greater than 0. If so, flag BERGAB is set to 1 in step 212 and the program is ended and run again at the next specified point in time. If the answer to step 210 is 'No', a check is performed in step 218 to determine whether at least one wheel brake pressure PiRAD is greater than zero, and whether controlling of the brake pressure is being carried out at least partly on the basis of the speed controller. This is determined based on the controller output signal. If this is not the case, the BERGAB flag is set to zero in step 216; otherwise the program is ended and the flag remains set at 1.

The method described above is used in the preferred exemplary embodiment in the case of cruise controls for hill descent, in particular for off-road vehicles (HDC or hill descent control function). In other embodiments, the method described above can also be used in conjunction with speed controllers used to limit speed to a predefined value when the vehicle is descending in a normal on-road situation.

In another example of an application, electromotive brake systems are used instead of hydraulic or pneumatic systems. The term 'brake pressure' is therefore understood to also mean the brake application force, braking force or braking torque generated by brake systems of this kind.

In another embodiment, the speed is limited to a setpoint value, as opposed to being regulated to a setpoint value.

Above, it was described how activation of the controller, i.e., limiter, is based on detection of descent based on the vehicle's self-acceleration arising from the drive force associated with the incline, the acceleration not being due to depression of the accelerator. In addition, the controller, i.e., limiter, can also be activated based on whether the accelerator has been depressed if the driver modifies (e.g., increases) the setpoint speed, which is based on the accelerator position, by depressing the accelerator.

What is claimed is:

1. A method for controlling a vehicle, comprising the steps of:
   determining an actual speed of the vehicle;
   predefining a setpoint speed;
   detecting whether the vehicle is traveling on decent;
   calculating at least one manipulated variable based on the actual speed and the setpoint speed only when the vehicle is detected as traveling on the descent;
   influencing the actual speed of the vehicle on the basis of the at least one manipulated variable; and
   applying a brake pressure to at least one wheel brake based on a difference between the actual speed and the setpoint speed such that the actual speed is brought in line with the setpoint speed, the step of applying being performed according to one of a condition when the actual speed exceeds the setpoint speed and, if the actual speed is lower than the setpoint speed, a condition when the actual speed is approaching the setpoint speed.

2. A method for controlling a vehicle, comprising the steps of:
   determining an actual speed of the vehicle;
   predefining a setpoint speed;
   detecting whether the vehicle is traveling on a descent;
   calculating at least one manipulated variable based on the actual speed and the setpoint speed only when the vehicle is detected as traveling on the descent;
   influencing the actual speed of the vehicle on the basis of the at least one manipulated variable; and
   causing a tilt sensor to supply a signal, wherein the step of detecting whether the vehicle is traveling on the descent includes the step of evaluating the signal supplied by the tilt sensor.

3. A method for controlling a vehicle, comprising the steps of:
   determining an actual speed of the vehicle;
   predefining a setpoint speed;
   detecting whether the vehicle is traveling on a descent;
   calculating at least one manipulated variable based on the actual speed and the setpoint speed only when the vehicle is detected as traveling on the descent;
   influencing the actual speed of the vehicle on the basis of the at least one manipulated variable;
   determining an actual acceleration of the vehicle; and
   calculating a model acceleration based on a driving torque; wherein
   the step of detecting whether the vehicle is traveling on the descent includes the step of detecting the descent only if a rate of change of the actual acceleration is positive and a difference between the actual acceleration and the model acceleration is also positive.

4. The method according to claim 3, wherein:
   the step of detecting whether the vehicle is traveling on the descent includes the step of detecting the descent only if the positive rate of change of the actual acceleration is due to a self-acceleration of the vehicle associated with traveling downhill.

5. The method according to claim 3, further comprising the step of:
   in an absence of a signal combination, detecting the descent if a brake pressure is applied by a manipulated variable.

6. A device for controlling a vehicle, comprising:
   a control device for receiving a signal indicating an actual speed of the vehicle;
   a memory in which a setpoint speed is predefined; and
   an output arrangement via which a manipulated variable that influences the actual speed of the vehicle is output based on the actual speed and the setpoint speed in order to influence the actual speed of the vehicle; wherein
   the control device includes an enabling arrangement for enabling only the manipulated variable to be calculated and output, respectively, if a descent of the vehicle has been detected;
   the control device includes an arrangement for detecting the descent of the vehicle;
   the control device determines a signal representing an actual acceleration of the vehicle;
   the control device includes a model for calculating a model acceleration based on a driving torque; and
   the control device includes an arrangement for detecting the descent of the vehicle, the descent of the vehicle only being detected if a rate of change of the actual acceleration and a difference between the actual acceleration and the model acceleration are positive.

7. A device for controlling a vehicle, comprising:
   a control device for receiving a signal indicating an actual speed of the vehicle;
   a memory in which a setpoint speed is predefined; and
   an output arrangement via which a manipulated variable that influences the actual speed of the vehicle is based on the actual speed and the setpoint speed in order to influence the actual speed of the vehicle; wherein
   the control device includes an enabling arrangement for enabling only the manipulated variable to be calculated and output, respectively, if a descent of the vehicle has been detected;
   the control device includes an arrangement for detecting the descent of the vehicle; and
   the descent of the vehicle is only detected if a tilt sensor supplies a signal indicating the descent.

* * * * *

UNITED STATES PATENT AND TRADEMARK OFFICE
CERTIFICATE OF CORRECTION

PATENT NO. : 6,915,201 B1
DATED : July 5, 2005
INVENTOR(S) : Ott et al.

It is certified that error appears in the above-identified patent and that said Letters Patent is hereby corrected as shown below:

Column 5,
Line 34, change "is traveling on decent;" to -- is traveling on descent; --.

Signed and Sealed this

Thirteenth Day of December, 2005

JON W. DUDAS
*Director of the United States Patent and Trademark Office*